(12) United States Patent
Ramos et al.

(10) Patent No.: US 6,659,774 B1
(45) Date of Patent: Dec. 9, 2003

(54) DIAGNOSTIC GAME AND TEACHING TOOL

(75) Inventors: James G. Ramos, Glenburn, ME (US); Shirley A. Ramos, Glenburn, ME (US)

(73) Assignee: Tri-Sil LLC, Glenburn, ME (US)

( * ) Notice: Subject to any disclaimer, the term of this patent is extended or adjusted under 35 U.S.C. 154(b) by 0 days.

(21) Appl. No.: 10/152,600

(22) Filed: May 21, 2002

(51) Int. Cl.[7] .......................... G09B 19/22; A63F 3/00
(52) U.S. Cl. ...................... 434/128; 434/170; 434/258; 273/243; 273/146; 273/236; 273/242; 273/275
(58) Field of Search ................................ 434/128, 170, 434/258, 247, 403; 273/243, 146, 236, 242, 275

(56) References Cited

U.S. PATENT DOCUMENTS

| | | |
|---|---|---|
| 1,480,360 A | 1/1924 | Agee |
| 3,464,124 A | 9/1969 | Lynd |
| 3,523,377 A | 8/1970 | Gardner |
| 3,566,484 A | 3/1971 | Sonnabend |
| 3,642,286 A * | 2/1972 | Moore ........................ 273/243 |
| 4,042,245 A | 8/1977 | Zarour |
| 4,188,734 A | 2/1980 | Rich |
| 4,306,868 A * | 12/1981 | Hankins ....................... 434/85 |
| 4,463,952 A | 8/1984 | Rowbal |
| 5,090,706 A | 2/1992 | Hokanson |
| 5,156,407 A * | 10/1992 | Moore ........................ 273/249 |
| 5,167,503 A | 12/1992 | Jordan |
| 5,316,482 A | 5/1994 | Bryson |
| 5,318,447 A | 6/1994 | Mooney |
| 5,362,061 A | 11/1994 | Napolitano |
| 5,487,668 A | 1/1996 | Oyen et al. |
| 5,509,661 A | 4/1996 | Parsley |
| D380,922 S | 7/1997 | Perrotti et al. |
| 5,707,239 A | 1/1998 | Butler |
| 5,727,946 A | 3/1998 | Rosen |
| 5,752,701 A | 5/1998 | Kao |
| 5,803,742 A | 9/1998 | Buti |

FOREIGN PATENT DOCUMENTS

| | | | |
|---|---|---|---|
| CH | 686288 * | 2/1996 | ............. A63F/9/04 |
| DE | 20207085 U1 * | 10/2002 | ............. A63F/3/00 |

OTHER PUBLICATIONS

Joan Gillis "Sample Math Games" copywrite 2001, pp. 2–3 (www.teachersfirst.com).*

* cited by examiner

Primary Examiner—Derris H. Banks
Assistant Examiner—Dmitry Suhol
(74) Attorney, Agent, or Firm—John P. McGonagle

(57) ABSTRACT

A plurality of large, tactically soft, cubes, and a plurality, of learning game boards. Each side of a learning cube has imprinted thereon a teaching concept. Each learning game board has a teaching concept imprinted thereon corresponding to a learning cube.

8 Claims, 13 Drawing Sheets

DIAGNOSTIC GAME AND TEACHING TOOL

BACKGROUND OF THE INVENTION

This invention relates to a diagnostic and teaching game and, in particular, to a learning cube used together with a learning game board, the combination of which is particularly helpful with language learning disabled children.

The use of educational board games is known in the prior art. There are many games commercially available which have educational aspects. Many such games require that the child who will play the game shall have a rudimentary ability to read or count or recognize colors. There are very few games in the prior art which enable a player to come to the playing board and enjoy play at that board without such rudimentary knowledge wherein numbers, or letters, and colors provide important aspects of playing at the board.

It is the intent of the present invention that, with very little adult supervision, a child, especially of preschool age and experience, will come to learn their letters, numbers, and colors in the course of playing the game. It is also the intent of the present invention to provide a child with a way to read and learn that utilizes the tactile senses while stimulating the cognitive learning process. The present invention may be used to encourage the learning process, no matter what the player's level is, while providing a sense of achievement by offering the player something they can learn. The present invention can also be used by professionals to identify problem areas and provide a tool as part of a therapist plan.

The present invention is particularly useful with language learning disabled children, in addition to the adult rehabilitation population, special educators, and adults who have had strokes which have damaged the left language-learning side of their brains.

SUMMARY OF THE INVENTION

The present invention is comprised of a number of large, tactically soft, cubes, and a number of learning boards. Each side of a learning cube has imprinted thereon a teaching concept. For instance, numbers, in both alpha and numeric form, may be imprinted on several cubes depending on how high the number chain being taught will progress. A corresponding learning board with spaces and imprinted numbers thereon is provided. A numbered learning cube may be rolled by one or more children and a number that they see as they pick up the learning cube sounded out. The corresponding number is then selected on the learning board. Participants are encouraged to learn while playing a game. The player's dexterity, sorting skills and eye-hand coordination are also simultaneously built.

These, together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
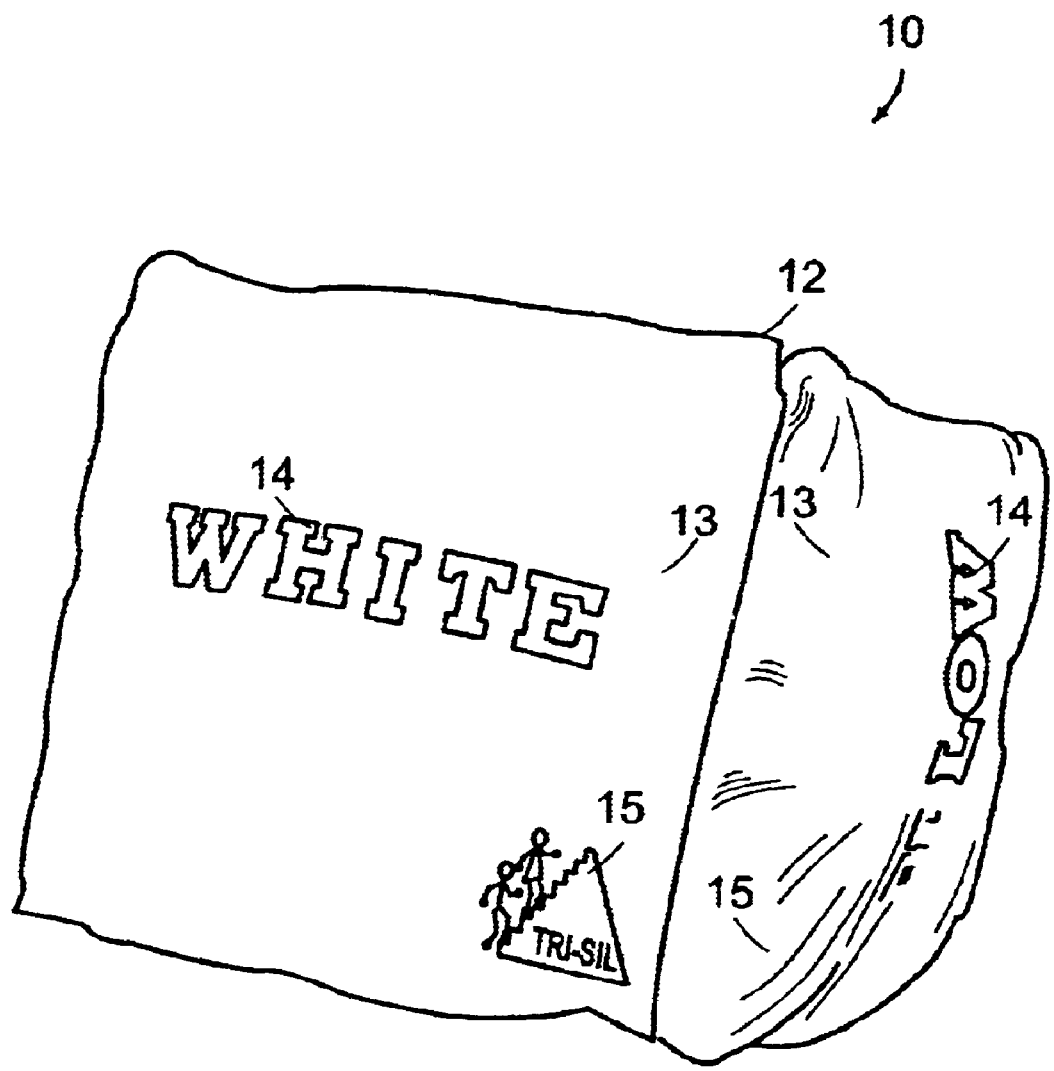
FIG. 1 is a perspective view of a typical learning cube with a color and corresponding color name on each face.

Referring to the drawings in detail wherein like elements are indicated by like numerals, there is shown a learning cube 10 constructed according to the present invention 1. The learning cube 10 is relatively large, having a soft, resilient interior and a rugged, but soft, exterior 12. Each learning cube 10 has six faces 13 with each learning cube 10 typically having one or more unique alphanumerics 14 and a unique color 15 on each face 13. FIG. 1 illustrates a typical learning cube 10, said learning cube having six faces 13, a unique color 15 on each face 13, and the name 14 of the color imprinted thereon.

Figure 2:
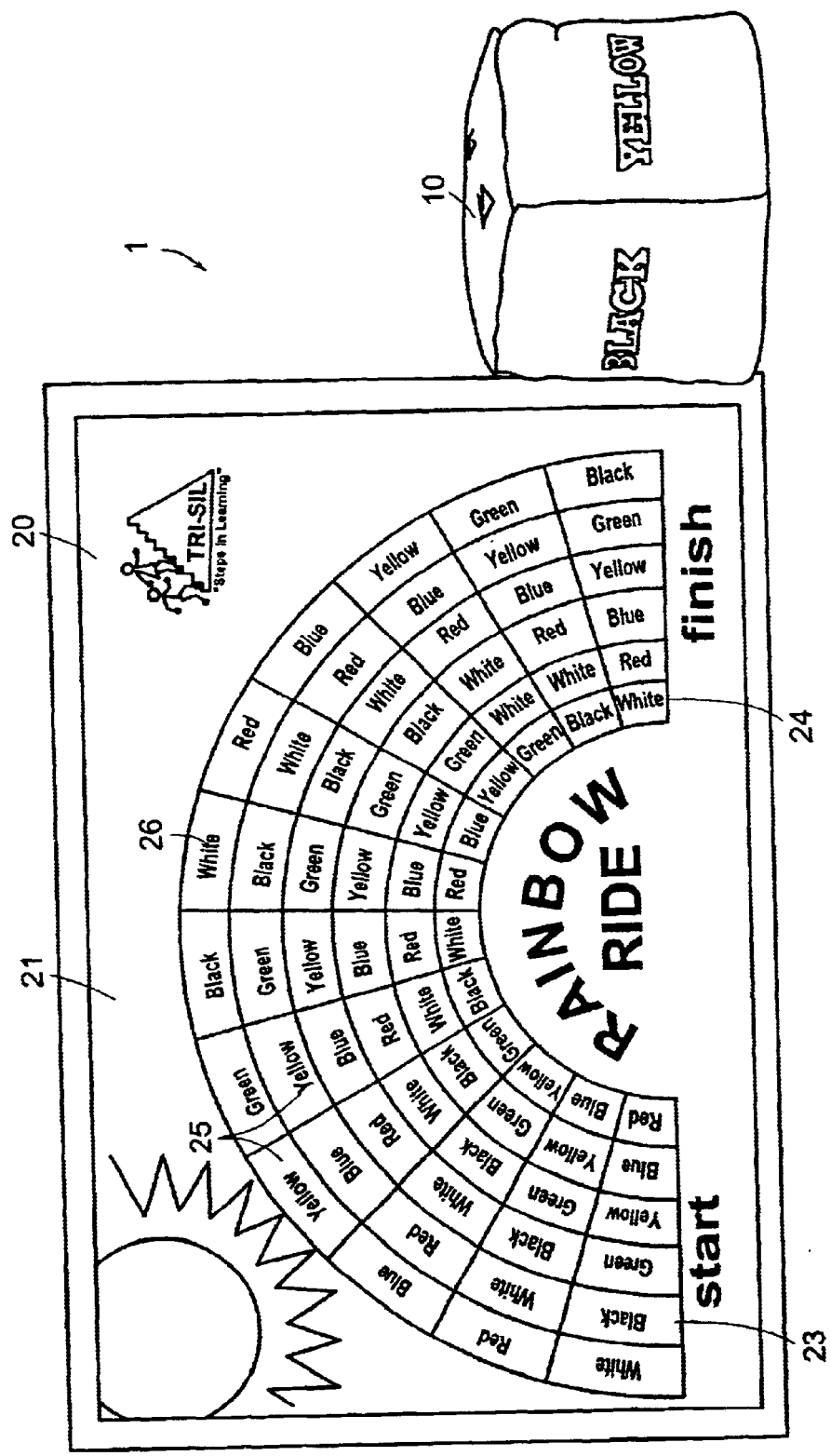
FIG. 2 is a perspective view of the learning cube of FIG. 1 and a learning game board with spaces showing corresponding colors and color names.

FIG. 2 illustrates the invention learning cube 10 of FIG. 1 alongside a corresponding invention learning game board 20. Each game board 20 is flat and generally rectangular in shape. The game board 20 has a top playing surface 21 and an opposite bottom surface. The top playing surface 21 has a series of playing spaces 25 grouped six abreast and shaped generally as a rainbow. The grouped playing spaces have a start line 23 and a finish line 24. Each space 25 has a unique color corresponding to one of the colored learning cube faces 13 and the word 26 for the color imprinted on the space 25.

The method of playing a "colors" game is as follows. Given the size and softness of the learning cube 10 the player may be allowed just to initially "play" with the learning cube 10 as a play object. After an initial period of random play, and starting with the learning cube 10, a teacher, i.e., parent, care giver, teacher, therapist, shows the learning cube 10 to the playing player(s), e.g., child, etc., and teaches each color 15 on a learning cube face 13 to the player and the word 14 for the color shown on the learning cube face 13.

The learning game board 20 is then introduced. The teacher then explains the spaces 25, colors and words 26 in the playing spaces 25 and how they correspond with the learning cube faces 13, thereby reinforcing the recognition of the colors and their corresponding words. Each player is given a playing piece and initially positioned on the learning game board starting line 23.

Game play begins with the teacher rolling or tossing the learning cube 10 to the player, or having one player rolling or tossing the learning cube 10 to another player. When the learning cube 10 is rolled or tossed, the face 13 facing up is the one to focus on. The player moves his or her playing piece forward, i.e., toward the finish line 24, to the first playing space 25 having the color 15 shown on the learning cube face 13. The game is repeated until each player has reached the board finish line 24.

Figure 4:
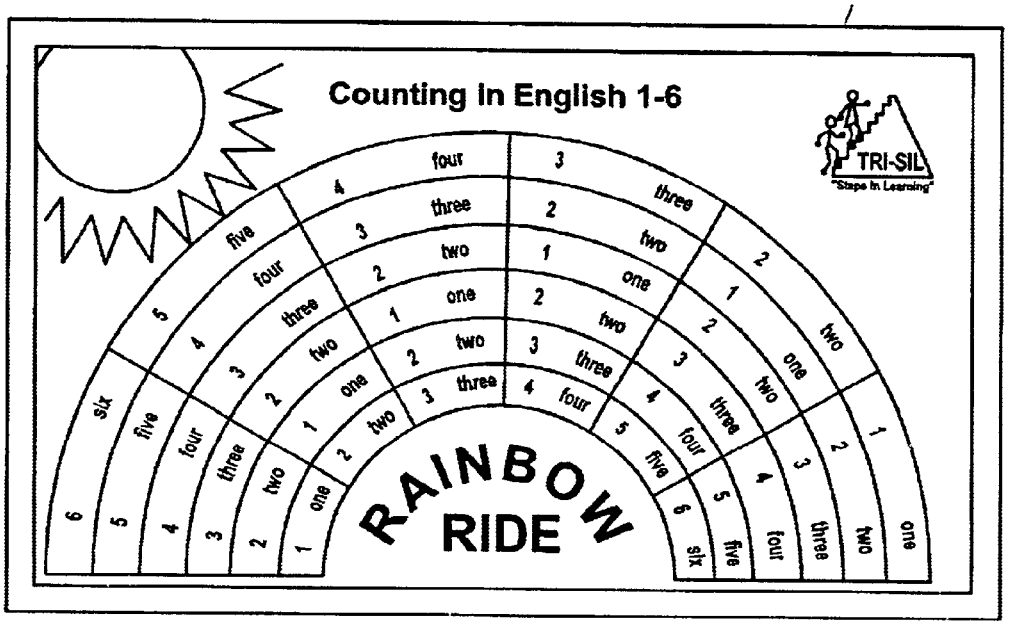
FIG. 4 is a learning game board with individual spaces designating the numbers 1–6, the words for each number, and a unique color.
Figure 5:
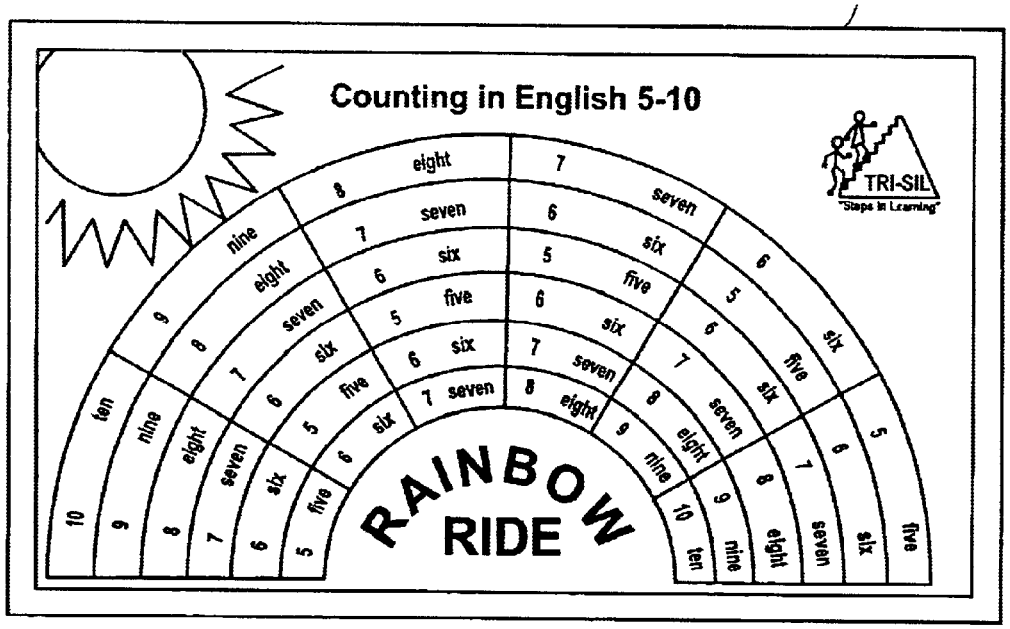
FIG. 5 is a learning game board with individual spaces designating the numbers 5–10, the words for each number, and a unique color.

Referring to FIGS. 4 and 5, the "colors" game may then be followed with a number "counting" game which will also reinforce the "colors" game. The learning cube 10 provided would have a number on each face, i.e., 1 through 6 on one learning cube and 5–10 on a second learning cube, and the corresponding word 14 for each number. Each face would also have a unique color. For example, the learning cube face 13 with the number "6" may be green. The learning cube face 13 with the number "4" may be yellow. The corresponding learning game board 20 has a top playing surface 21 and an opposite bottom surface. The top playing surface 21 has a series of playing spaces 25 grouped six abreast and shaped generally as a rainbow. The grouped playing spaces have a start line 23 and a finish line 24. Each space 23 has a unique color corresponding to one of the colored learning cube faces 13, a corresponding number and the word 26 for the number imprinted on the space 25.

Game play begins with the teacher rolling or tossing the learning cube 10 to the player, or having one player rolling or tossing the learning cube 10 to another player. When the learning cube 10 is rolled or tossed, the face 13 facing up is the one to focus on. The player moves his or her playing piece 9 forward, i.e., toward the finish line 24, to the first playing space 25 having the color/number/number-word 26, 14, 15 shown on the learning cube face 13. The game is repeated until each player has reached the board finish line 24.

Figure 12:
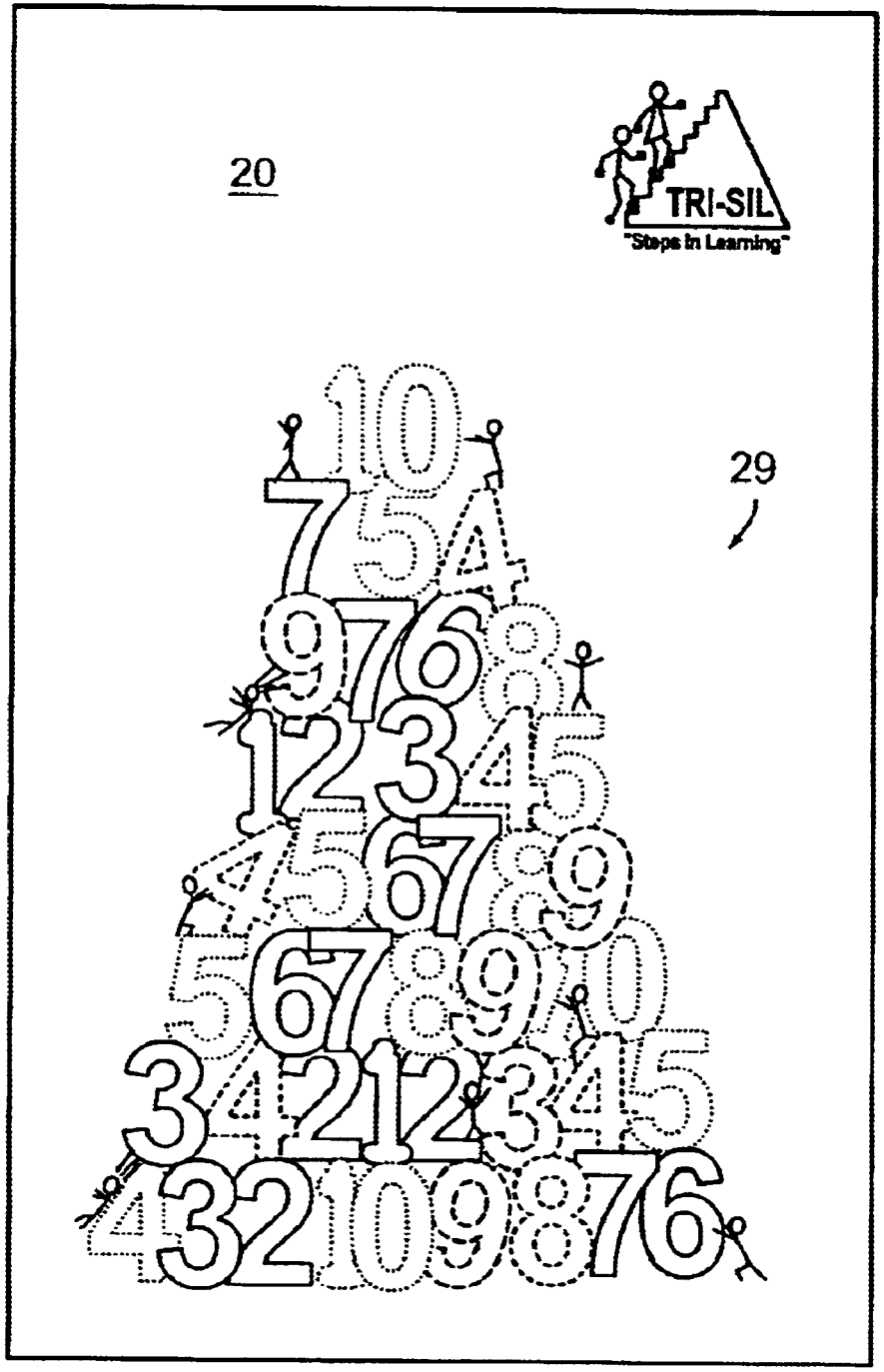
FIG. 12 is a learning game board having mixed numbers of various colors thereon.

Number counting may be reinforced and further advanced using a color number scramble game as shown in FIG. 12. Any of the numbered cubes 10 may be used for this game. The learning game board 20 has a plurality of numerals 29 in outline form, scrambled about the board playing surface 21. Each player is given a different color wipe-off marker. The learning cube 10 is tossed or rolled as described above. The number 14 that is face-up is the number to focus on. The player then locates a corresponding number 29 on the board playing surface 21 and colors it in.

Figure 6:
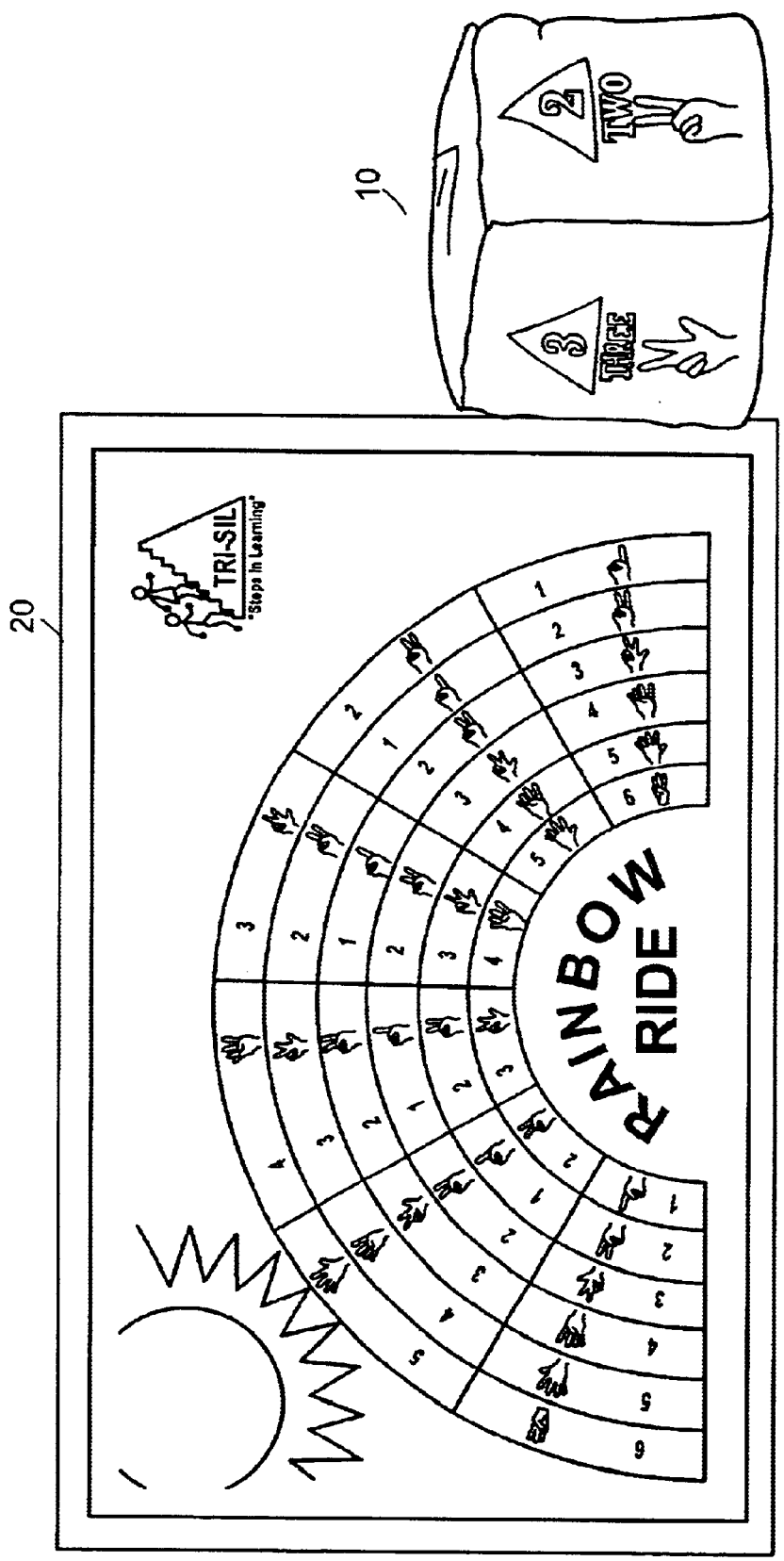
FIG. 6 is a perspective view of a learning cube with a number, corresponding word, hand sign designator and unique color on each learning cube face, and a learning game board with corresponding representations for the numbers 1–6.
Figure 7:
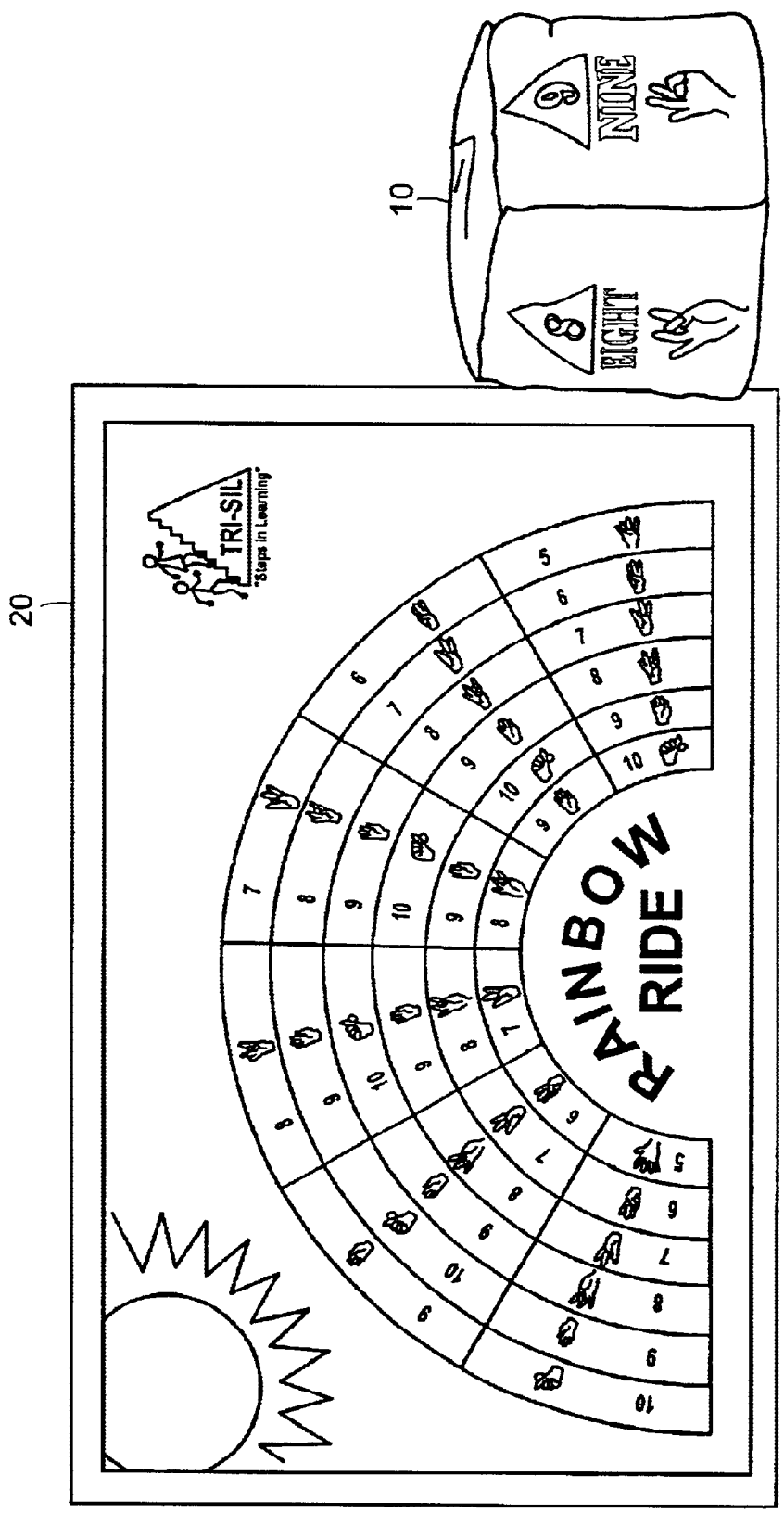
FIG. 7 is a perspective view of a learning cube with a number, corresponding word, hand sign indicator and unique color on each learning cube face, and a learning game board with corresponding representations for the numbers 5–10.
Figure 8:
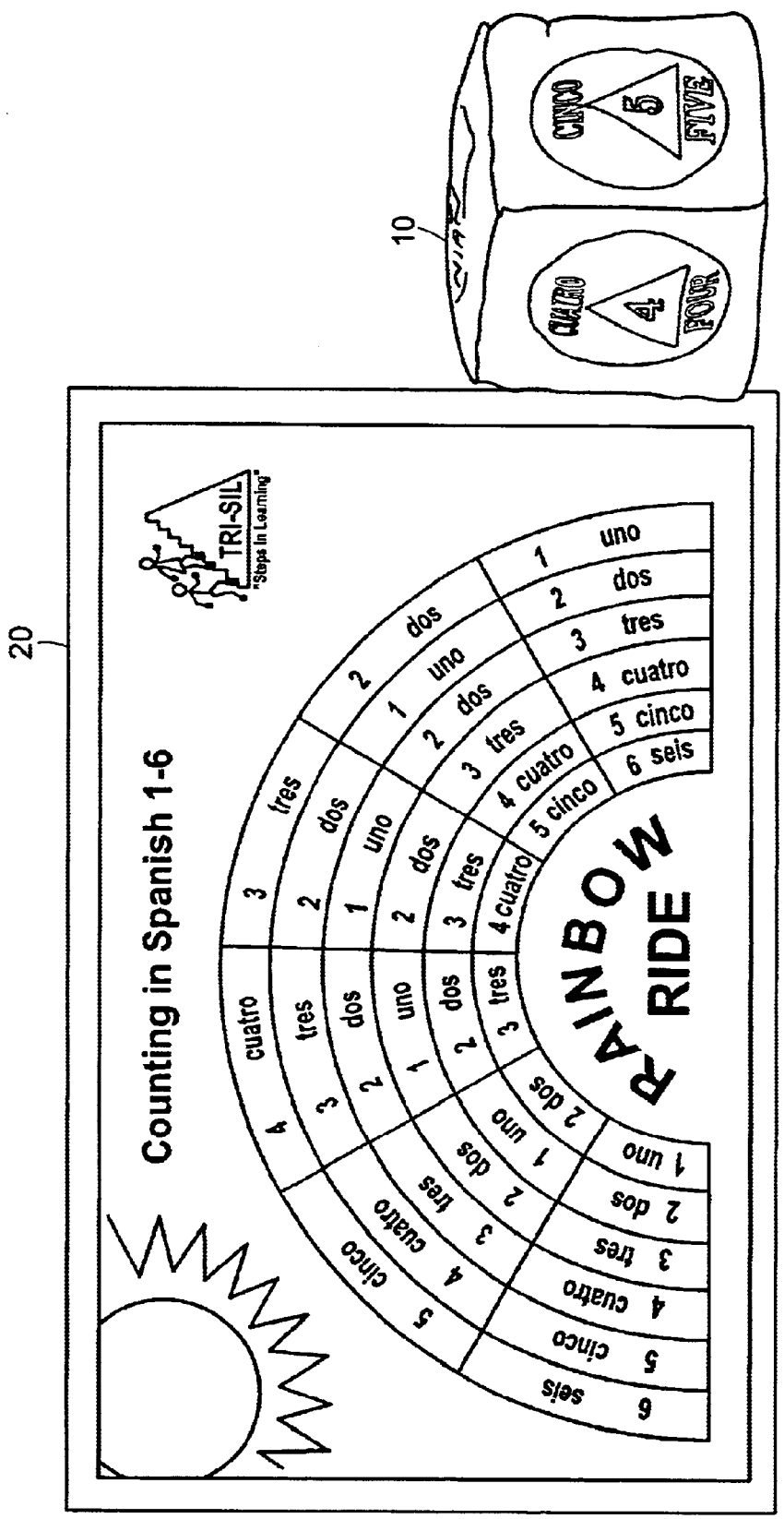
FIG. 8 is a perspective view of a learning cube with a number, corresponding Spanish word and unique color on each learning cube face, and a learning game board with corresponding representations for the numbers 1–6.
Figure 9:
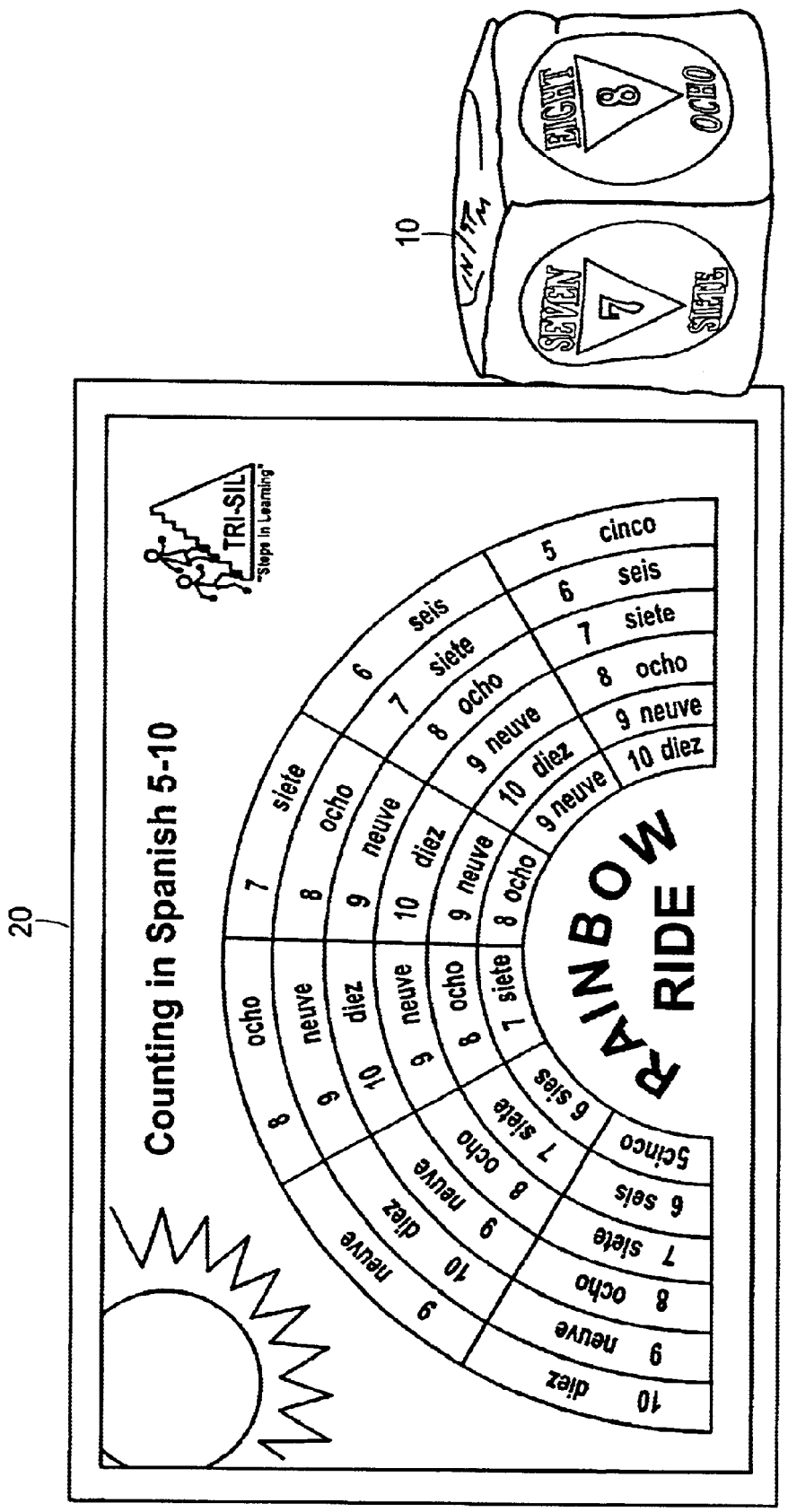
FIG. 9 is a perspective view of a learning cube with a number, corresponding Spanish word and unique color on each learning cube face, and a learning game board with corresponding representations for the numbers 5–10.
Figure 10:
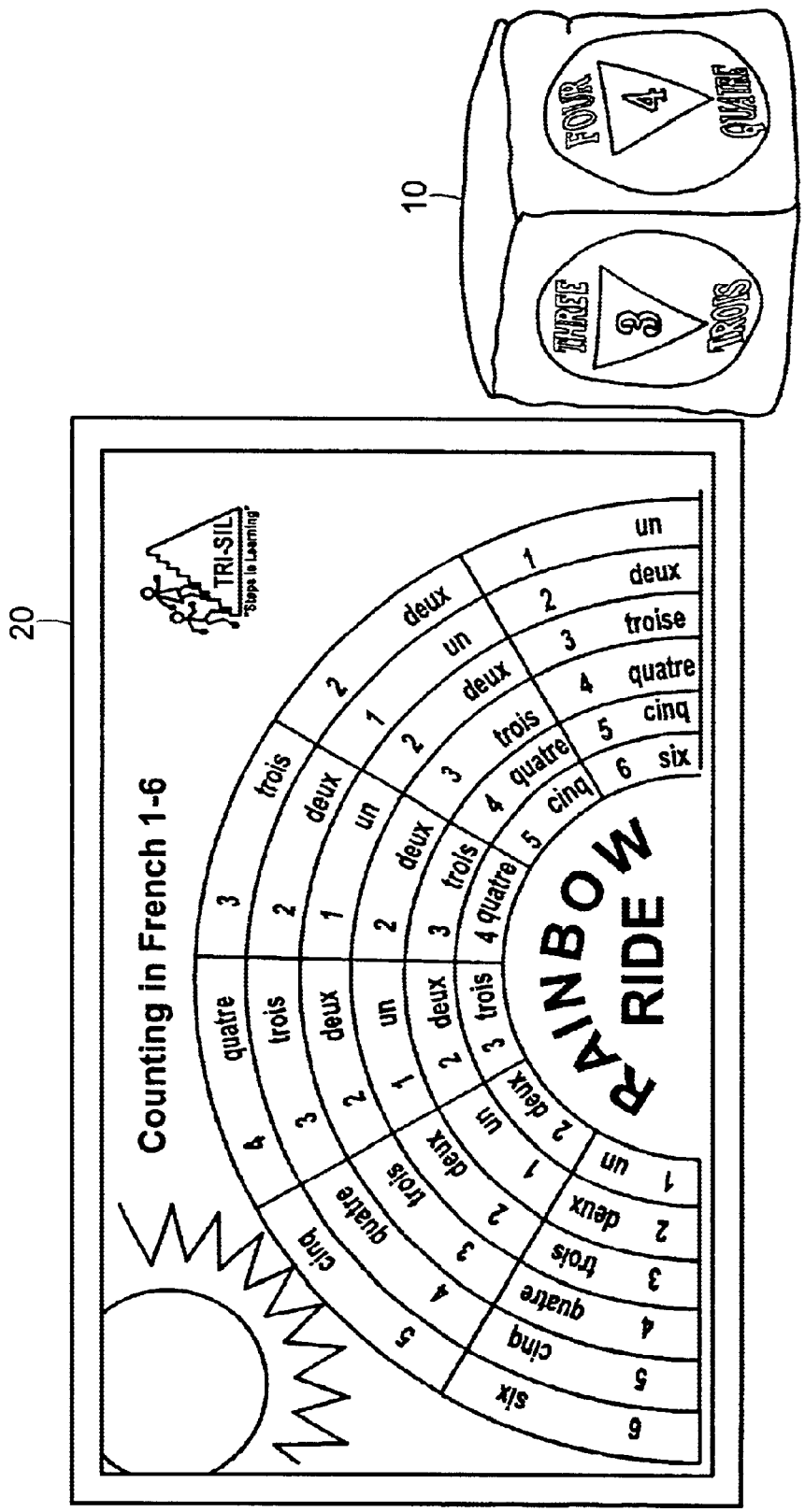
FIG. 10 is a perspective view of a learning cube with a number, corresponding French word and unique color on each learning cube face, and a learning game board with corresponding representations for the numbers 1–6.
Figure 11:
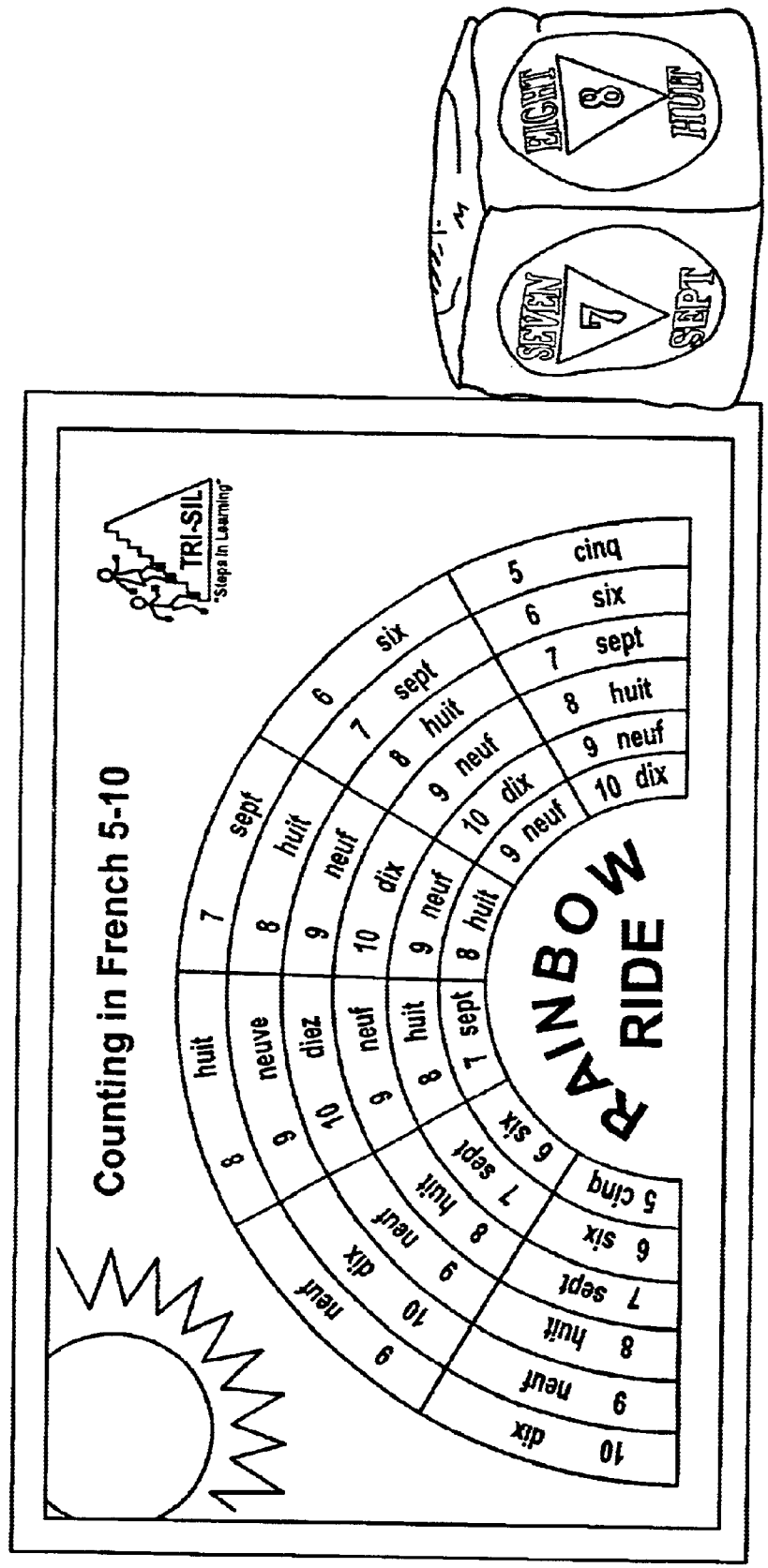
FIG. 11 is a perspective view of a learning cube with a number, corresponding French word and unique color on each learning cube face, and a learning game board with corresponding representations for the numbers 5–10.

Other variations may include: color/number/sign (FIGS. 6 and 7); color/number/Spanish number word (FIGS. 8 and 9); and color/number/French number word (FIGS. 10 and 11).

Figure 3:
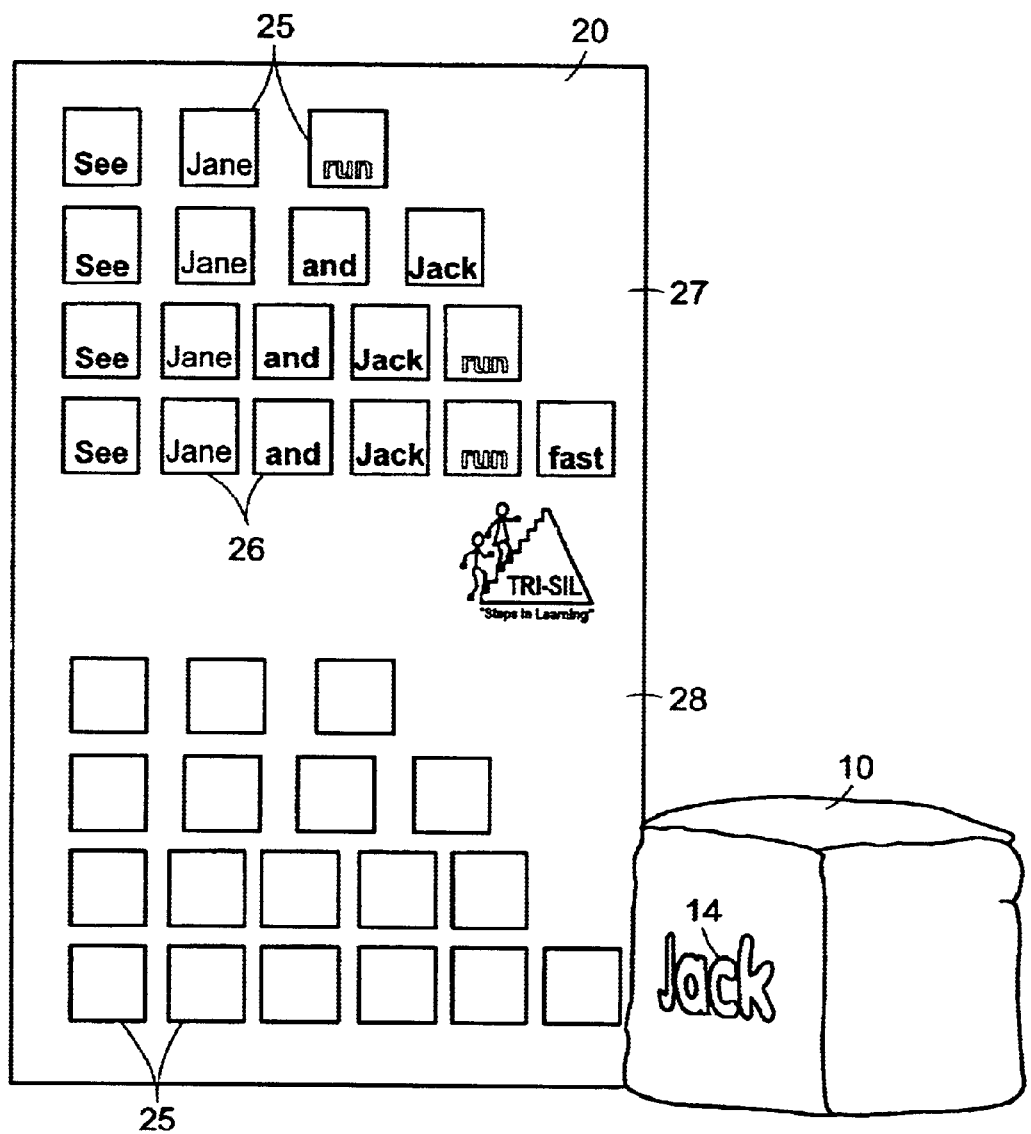
FIG. 3 is a perspective view of a learning cube with a word on each learning cube face, and a learning game board with spaces having the corresponding learning cube words.

The invention 1 may be used for more advanced play as in "sentence structure" shown in FIG. 3. The learning cube 10 has various words 14 on the learning cube faces 13. In this embodiment of the invention, the words 14 are: "see", "Jane", "and", "jack", "run" and "fast". The learning game board playing spaces 25 are arranged in two groups 27, 28. The first group 27 is comprised of four lines of spaces each line having an increasing number of playing spaces 25, increasing from three spaces to six spaces. The first group lines of spaces make up simple sentences, one word 26 to a playing space 25, corresponding to the words 14 on the learning cube faces 13. The second group 28 have the same space arrangement as the first group 27, but all spaces 25 are blank. Instead of a playing piece, a wipe-off marker is used. When the learning cube 10 is rolled or tossed, the word 14 on the upright face 13 is written by either the teacher or player on a playing space in the second group 28 corresponding to the playing space 25 with the word 26 in the first group 27. This activity helps the player to build sentences, match words and count within the structure of the present invention 1.

Figure 13:
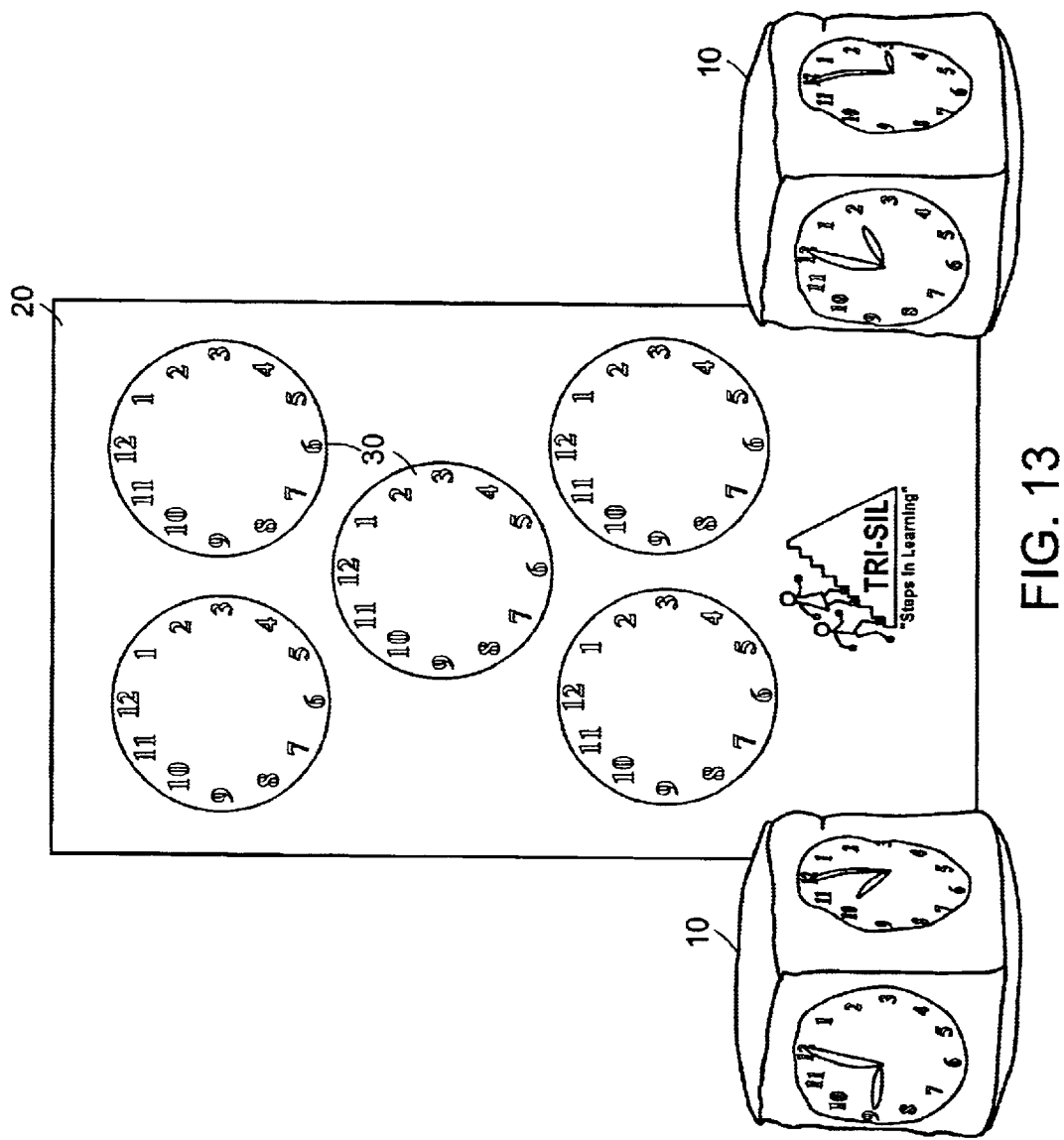
FIG. 13 is a perspective view of two cubes with clock faces having hands illustrated on each face, a learning game board with a plurality of clock faces thereon.
Figure 14:
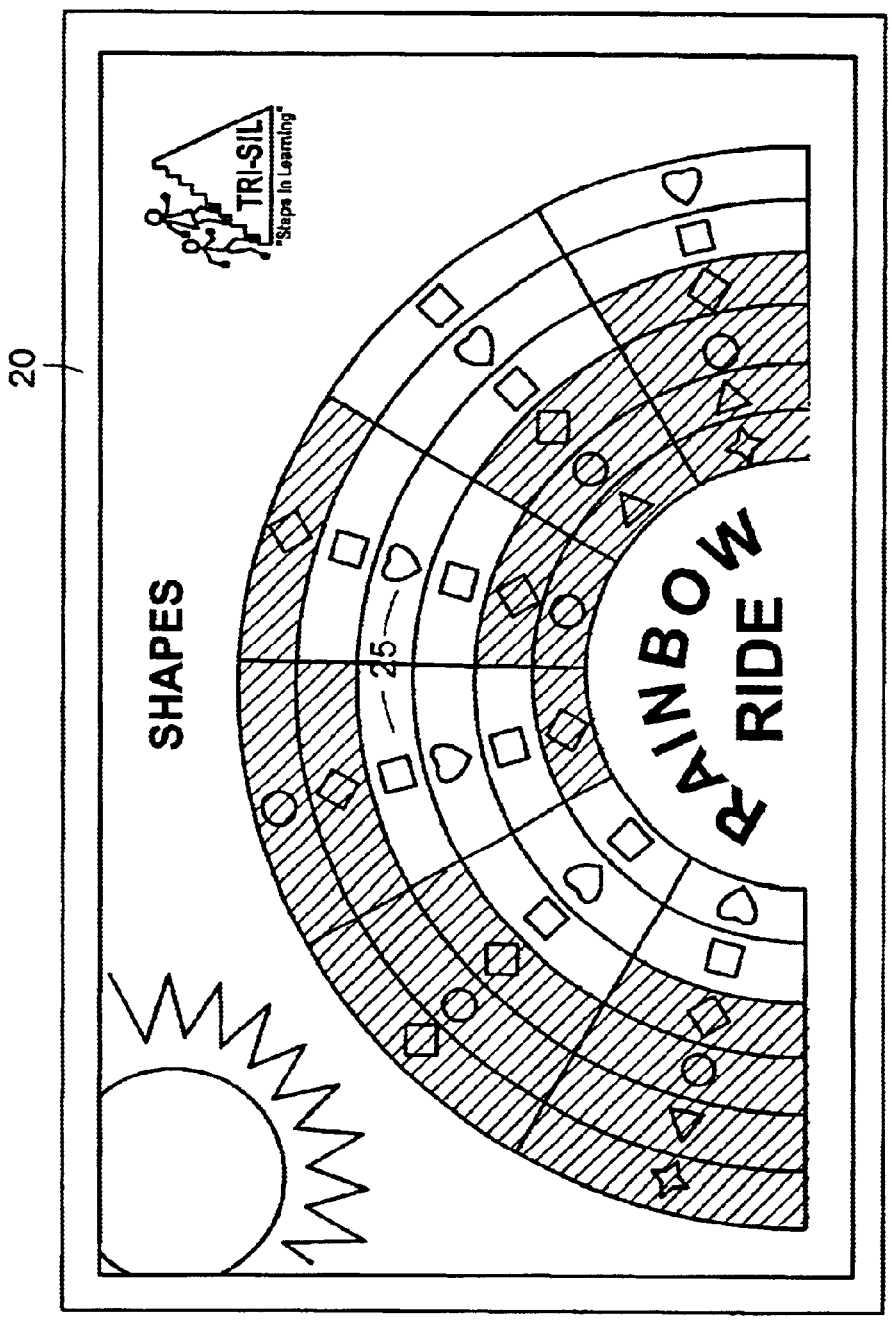
FIG. 14 is a learning game board with spaces showing different shapes.

The invention 1 may be used to teach a player to tell time. See FIG. 13. The learning cube faces 13 have the standard colors described above, but also a clock face 16 with a different set of clock hands 17 illustrated on each face. The corresponding learning game board 20 has a plurality of clock faces 30 thereon. Each player is given a different color wipe-off marker. The learning cube 10 is tossed or rolled as described above. The clock face 16 with a specific set of clock hands 17 that is face-up is the clock setting to focus on. The player then draws the time shown on the cube clock on a learning game board clock face 30.

The present invention has been found to be particularly effective among preschool children with learning impairments. The following case is especially illuminating.

Case

Subject was a three year, eleven months old, autistic child. Subject's social interaction was manifested by a marked impairment the use of multiple nonverbal behaviors such as eye contact avoidance, poor peer relationship development, poor social interaction, and lack of social and emotional reciprocity. Subject manifested a delay in or lack of spoken language development. Subject lacked spontaneous make-believe play and social imitative play appropriate to the child's developmental level. The subject had restricted repetitive and stereotyped patterns of behavior such as preoccupation with looking out a window for hours at a time, inflexibility in specific, nonfunctional routines or rituals, and stereotypical and repetitive motor mannerisms, e.g., hand or finger flapping. Activities with child developmental therapist was severely protested.

At one therapy session, a learning cube with colored faces was introduced. Subject started to smile, came running over knocking everything out of his way, and reached for the learning cube. Subject then rolled the cube around in his hands and attempted to bounce it off the floor. Subject laughed when it did not bounce but rolled a little, and then went chasing after it. The therapist then took the learning cube from the subject and stated that it was "her turn". The therapist then started working with the subject regarding the colors on the cube with the subject responding to them by touching the colored learning cube faces and smiling at them. The therapist then went over the colored faces with the subject, naming all the colors several times. Subject then took his turn. Subject squished the learning cube between his hands and laughed several times. He then turned the learning cube over and over to give himself a better look at each color. The therapist sat on the floor with the subject while the subject turned the cube around and the therapist stated the color. This lasted approximately 25 minutes.

At a session a few weeks later, the therapist brought out the learning cube again, tossed the learning cube up, caught it and asked the subject "what color it is?" Subject then stated the correct color. This continued between therapist and subject until subject had learned all six colors.

The therapist then introduced a learning cube with colored faces, each face also having a specific shape, e.g., square, star, triangle, etc. When subject first saw the shapes on the learning cube, he wanted to go to the color that he remembered from the first learning cube. After a period of time, subject was able to identify the shapes. The color consistency between cubes appears to have aided his transition to shape learning.

At this point subject was now able to toss or roll the learning cube on his own. Subject's speech has improved and he now has expressions and gestures. In relating to people he has become responsive, has a social smile, makes eye contact, and seeks social contact.

The therapist then began working with the subject with sign language, number learning cubes. Subject became excited, laughing and giggling the entire time, and in one session was able to learn signs for the numbers 1 through 10. He was able to do them forward and backwards.

After learning his colors, shapes and to count in sign language from one to ten, the therapist and subject started to work with the invention game boards. Beginning with the color board, the color cube was rolled. A game piece was then placed by the subject on the board with the same colored playing space as the color of the upward face of the cube. The therapist and subject proceeded with the "game", each alternating turns. When both got to the point where there was not a direct move, the subject accepted the fact that he could "jump" to the color that was face up. The therapist and subject then progressed to shapes. When the subject knew all the shapes, the therapist and subject used the color board to reinforce the colors and sight words of the shapes. The therapist then would point to a color on the board and the subject would turn to that color on the cube and was able to tell the therapist what shape it was.

After the subject became fluent in the sign language numbers one through ten, subject and therapist started working with the game board. The game pieces were not used initially. The therapist would roll the cube and then show the number that was face up to the subject and ask the subject to "show me the number three" and then find it on the game board. The subject did this very quickly. After a couple of sessions, the subject was ready to use the game board with a game piece. The therapist and subject would take turns tossing the cube and moving the game piece. The subject is able to sit and play this game for twenty to thirty minutes at a time.

The subject enjoyed using the game boards as an added feature to the learning sessions. Soon the subject was able to roll the cubes himself and ask the therapist questions. The next game board the therapist and subject progressed to was the "Number Scramble" board. Using the sign language cube with numbers on it, the therapist would roll it and subject would point to the number indicated on the board that corresponded to the number that was face up on the cube. Both began using wipe-off markers wherein the subject would toss the cube, find the number indicated on the board and color it in. This helped the subject to improve his fine motor skills and his ability to concentrate on doing several different things at one time. The subject has also improved with turn taking.

The next progressive step was to the "Clock Cube". Subject at this point knows his colors, shapes, and numbers, and has dramatically improved fine motor skills. The therapist began by turning the 1:00 clock face and progressed to 12:00. Subject quickly learned what each side of the cube meant. The therapist and subject then brought in the game board. At this time the subject was able to write on the game board what he had learned while playing with the cube. This whole lesson took up one three-hour session.

During the above learning period, the development therapist was working with the subject approximately twenty hours per week. There was one other therapist working with the subject approximately five hours per week. The second therapist was not using the cubes or game boards. During the above learning period, the subject was receiving speech or occupational therapy.

The learning cubes and game boards work well because it is a very tactile approach and appeals to the senses. Any young child who cannot read and for whom language is difficult needs experience-based learning. It is important that their learning be accomplished through all the sensory channels. Preschool children learn by using play to translate experience into understanding. The following are sample curriculums which may be devised using the learning cubes and boards of the present invention.

CURRICULUM I (Colors/Shapes)

A. Promoting Dexterity of Motor Skills: students use a series of motor skills to create and perform a movement pattern such as turning, twisting, catching and throwing a cube. Non-locomotive skills are learned and enhanced by turning and twisting a cube in place. Movement skills are learned and enhanced by tossing a cube to a partner and catching a cube.

B. Identify and Recognize Primary Colors and Shapes: students use viewing strategies to experience, understand and appreciate differences and similarities in colors and shapes; students also acquire fluency in language as they acquire concepts and attached words to those concepts. Simple skillful responses to primary colors and shapes are demonstrated through imitation and reinforcement. Students learn and differentiate between primary colors and shapes.

C. Identify and Recognize Letters and Words: students recognize letters and words which make up the words for colors and shapes. This leads into learning elementary reading skills.

D. Understand Use of Language and Symbols To Communicate: students understand the use of words and visual symbols. Students see the relationship between word and visual presentation, i.e., color and color-word, and shape and shape-word.

E. Promoting Sorting and Matching Skills: students become aware of the concept of same versus different for matching. Students are able to correlate colors, symbols and words on the cube with colors, symbols and words on the learning boards.

CURRICULUM II (Alphabet)

A. Identify and recognize the letters that make up the alphabet: students identify the differences and similarities between letters in the alphabet through interactive play with the learning cubes and boards.

B. Apply basic knowledge and understanding of types and purpose of letters: students identify and understand that letters in alphabet make up words using examples shown on learning cubes and boards.

C. Making connections between letters and constructing words: students understand how letters make words different and similar.

D. Understanding the structure of grouping letters together to form words: students understand the diverse sounds or each letter of the alphabet.

It is understood that the above-described embodiments are merely illustrative of the application. Other embodiments may be readily devised by those skilled in the art which will embody the principles of the invention and fall within the spirit and scope thereof.

We claim:

1. A diagnostic game and teaching tool for language learning disabled children, comprising:

a plurality of tactically soft, learning cubes, each said learning cube having a resilient interior and a rugged, soft exterior, each said learning cube having six faces, each said face having a teaching concept imprinted thereon;

a plurality of learning game boards, each said learning game board having a teaching concept corresponding to a learning cube;

a plurality of playing pieces adapted for placement on a learning board;

wherein each said learning cube face has a plurality unique combination of a plurality of alphanumerics and a unique color, respective any of the other learning cube faces.

2. The game as recited in claim 1, wherein:

each said learning game board is flat and generally rectangular in shape, each said learning game board having a top playing surface and an opposite bottom surface, said learning board top playing surface having a series of playing spaces, each playing space having a color corresponding to a colored learning cube face.

3. The game as recited in claim 2, wherein:

said learning cube alphanumerics includes a word for said unique color; and said learning game board playing spaces include corresponding words for said learning cube words, said learning game board playing spaces being grouped together and shaped generally as a rainbow, said grouped playing spaces having a start line and a finish line.

4. The game as recited in claim 2, wherein:

said learning cube alphanumerics includes a number and a word for said number;

said learning game board playing spaces include corresponding numbers and words, said learning board playing spaces being grouped together and shaped generally as a rainbow, said grouped playing spaces having a start line and a finish line.

5. The game as recited in claim 2, wherein:

said learning cube alphanumerics includes a sign corresponding to said number;

said learning game board playing spaces include signs for said corresponding numbers and words, said learning board playing spaces being grouped together and shaped generally as a rainbow, said grouped playing spaces having a start line and a finish line.

6. The game as recited in claim 2, further comprising:

a wipe-off marker adapted to mark the learning game board;

wherein said learning cube alphanumerics includes a number and a word for said number;

wherein said learning game board has a plurality of numerals, in outline form, scrambled about the learning board top playing surface, said learning board top playing surface having a smooth, wipe-off surface.

7. The game as recited in claim 2, further comprising:

a wipe-off marker adapted to mark the learning game board;

wherein said learning cube alphanumerics includes a word;

wherein said learning game board playing spaces are arranged in two groups comprising:

a first group comprised of a plurality of lines of spaces, each line having an increasing number of playing spaces, said first group lines of spaces making up simple sentences, one word to a playing space, and one line to a sentence, said playing space words corresponding to the words on the learning cube faces; and a second group having the same space arrangement as the first group, all said second group spaces being blank;

wherein said learning board top playing surface has a smooth, wipe-off surface.

8. The game as recited in claim 2, further comprising:

a wipe-off marker adapted to mark the learning game board;

wherein said learning cube alphanumerics includes a clock face with a different set of clock hands illustrated on each face;

wherein each said learning game board playing space is comprised of a clock face, said learning board top playing surface having a smooth, wipe-off surface.

* * * * *